(12) United States Patent
Lu et al.

(10) Patent No.: US 8,811,283 B2
(45) Date of Patent: Aug. 19, 2014

(54) ROUTING OF A MESSAGE IN A SHARED RADIO ACCESS NETWORK

(75) Inventors: Yang Lu, Düsseldorf (DE); Dierk Dohmann, Düsseldorf (DE); Leo Patanapongpibul, Surrey (GB)

(73) Assignee: Vodafone Holding GMBH, Dusseldorf (DE)

( * ) Notice: Subject to any disclaimer, the term of this patent is extended or adjusted under 35 U.S.C. 154(b) by 398 days.

(21) Appl. No.: 13/197,315

(22) Filed: Aug. 3, 2011

(65) Prior Publication Data
US 2012/0044866 A1 Feb. 23, 2012

(30) Foreign Application Priority Data
Aug. 20, 2010 (EP) ..................................... 10173614

(51) Int. Cl.
*H04W 4/00* (2009.01)
*H04L 12/54* (2013.01)
*H04W 48/18* (2009.01)
*H04W 40/02* (2009.01)
*H04W 92/04* (2009.01)

(52) U.S. Cl.
CPC ........... *H04W 48/18* (2013.01); *H04L 12/5691* (2013.01); *H04W 40/02* (2013.01); *H04W 92/045* (2013.01)

USPC ............ 370/328; 370/310; 370/312; 370/338

(58) Field of Classification Search
None
See application file for complete search history.

(56) References Cited

U.S. PATENT DOCUMENTS

| | | | |
|---|---|---|---|
| 2004/0176135 A1* | 9/2004 | Palkisto | 455/560 |
| 2004/0185879 A1* | 9/2004 | Kong et al. | 455/458 |
| 2005/0075129 A1* | 4/2005 | Kuchibhotla et al. | 455/552.1 |
| 2005/0111409 A1* | 5/2005 | Spear et al. | 370/331 |
| 2006/0046729 A1* | 3/2006 | Woo et al. | 455/445 |

\* cited by examiner

*Primary Examiner* — Anez Ebrahim
(74) *Attorney, Agent, or Firm* — International IP Law Group, PLLC (57) ABSTRACT

The subject innovation relates to a system and method for routing in a base station system a message received from a mobile communication device to a core network. The base station system may be connected to at least two core networks and an identifier being assigned to each core network. An exemplary method comprises receiving in the base station system the message from the mobile communication device together with an identifier assigned to a first core network of the core networks. The identifier may be read in the base station system. The exemplary method also comprises forwarding the message from the base station system to the first core network based upon the read identifier.

10 Claims, 4 Drawing Sheets

ROUTING OF A MESSAGE IN A SHARED RADIO ACCESS NETWORK

CROSS-REFERENCE TO RELATED APPLICATION

This application claims priority to European (EP) Patent Application No. 10173614.8, filed on Aug. 20, 2010, the contents of which are incorporated by reference as if set forth in their entirety herein.

BACKGROUND

Mobile communication networks include a core network, which is operated by a mobile network operator and comprises network components for providing mobile services, such as services for speech and/or data connections. Mobile communication devices access the core network through a radio access network which is connected to the core network. The radio access network provides the radio technology for establishing wireless connections between mobile communication devices and the mobile communication network. It is configured as a cellular network comprising a plurality of radio cells and each radio cell is served by a base station system of the radio access network.

Usually, each core network operator provides his own radio access network for providing access to the operator's core network. However, the deployment of a radio access network involves high efforts and costs. Therefore, it has been proposed that core network operators share a common radio access network. In view of the Universal Mobile Telecommunications System (UMTS), configurations and procedures for shared radio access networks are described in the document TS 23.251 (version 9.2.0) of the 3rd Generation Partnership Project (3GPP). In a shared radio access network, the base station systems are connected to multiple core networks and have to route user data and signaling messages from mobile communication device to the correct core network, i.e. the core network the mobile communication device is registered in or—in the registration process—the core network in which the mobile communication wishes to register.

According to TS 23.251, a base station system of a shared radio access network includes in the broadcast system information broadcasted in the radio cells or cells served by the base station system the PLMN-IDs of the associated core networks. A mobile communication device takes the broadcasted PLMN-IDs into account in the PLMN selection process. Furthermore, the mobile communication device informs the base station system, which core network is selected, so that the base station system is enabled to route signaling messages and user data received from the mobile communication to the selected core network. The information is given in the Radio Resource Control (RRC) signalling which refers to the radio connection between the mobile communication device and the base station system. Thus, it is the base station system which has to assign the information which core network has been selected to the higher layer messages, which are transmitted from a mobile communication device to a core network via the base station system.

Exemplary embodiments of the subject innovation may allow for an easier routing of messages to a core network in a base station system of a shared radio access network connected to multiple core networks.

SUMMARY

The subject innovation relates to the routing of a message in a shared radio access network. More specifically, the subject innovation relates to a method for routing in a base station system a message received from a mobile communication device to a core network, the base station system being connected to at least two core networks. Furthermore, the subject innovation relates to a base station system and to a mobile communication device.

According to the subject innovation, a method for routing in a base station system a message received from a mobile communication device to a core network, the base station system being connected to at least two core networks, to each core network an identifier being assigned, comprises the steps of: Receiving in the base station system the message from the mobile communication device together with an identifier assigned to a first core network of the core networks, reading the identifier in the base station and the base station forwarding the message to the first core network based upon the read identifier.

The subject innovation may provide a base station system for use in shared radio access network. The base station system is connected to at least two core networks and to each core network an identifier is assigned. The base station system is adapted to receive a message from a mobile communication device together with an identifier assigned to a first core network of the core networks, and the base station system is further adapted to read the identifier and to forward the message to the first core network based upon the read identifier.

According to the subject innovation, there is suggested a mobile communication device for use in a shared radio access network connected to at least two core networks. To each core network an identifier is assigned and the mobile communication device is configured to send a message to a first core network via a base station system of the shared radio access network such that the message comprises the identifier assigned to the first core network.

An advantage of the exemplary method, the base station system and the mobile communication device according to the subject innovation may be that the core network to which the message is to be routed is determined using an identifier which accompanies the message. The determination is made, when the message is received and the identifier is read. Hereby, the routing of the message is simplified for the base station. Furthermore, the suggested routing mechanism can be implemented easily in other radio access technologies that do not provide another mechanism for informing a base station system about the core network to which a message is to be routed.

In connection with the determination of the core network to route the message tp, the base station system may select a network mode to which the message is to be routed. The determination of the network mode may be made by using an additional selection process in the base station system. The network mode is particularly not encoded in the identifier.

In one exemplary embodiment of the method, the base station system and the mobile communication device, the message comprises a request for registering the mobile communication device in the core network to which the identifier is assigned. Usually, the request for registration is the first message from the mobile communication device to the core network.

In an exemplary embodiment of the method, the base station system and the mobile communication device, the identifier is determined in the mobile communication device based upon information in a broadcast message broadcasted by the base station system in a radio cell of the shared radio access network in which the mobile communication device is located which corresponds to the radio cell served by the base station system. The mobile communication device may also determine the available core network and may select the core network to register in based upon the information in the broadcast message.

The shared radio access network may broadcast the identifiers of all connected core networks. In an alternative exemplary embodiment of the method, the base station system and the mobile communication device, the base station system broadcasts a common identifier and the mobile communication device determines the identifier based upon the common identifier. Hereby, the amount of data of the core network information and the capacity for transmitting the information on the broadcast channel are reduced. In order to determine the available core networks in the mobile communication device in this embodiment, a related embodiment of the method, the base station system and the mobile communication device provides that the mobile communication device determines the identifier using an allocation between the common identifier and the identifier stored in the mobile communication device.

In one exemplary embodiment of the method, the base station system and the mobile communication device, the identifier is included in the request. This embodiment may be advantageous, if the base station system also accesses the request itself in order to read further information from the request. In this case, the identifier can be read using the same mechanism, which is used for reading the other information.

In some mobile communication systems, such as the Global System for Mobile Communications (GSM), the base station system usually reads information from a registration request in case the request is sent with respect to a circuit switched part of the system. Therefore, in one exemplary embodiment of the method and the system, the request is an attach request, particularly a Location Updating Request of the type IMSI attach, for registering the mobile communication device in a circuit switched part of the core network to which the identifier is assigned (IMSI: International Mobile Subscriber Identity). A Location Updating Request of the aforementioned type is used in GSM system to request registration in a circuit switched part of a core network.

In a further exemplary embodiment of the method, the base station system and the mobile communication device, the message is a container message comprising a first part including the request and a second part including the identifier. The container message may particularly be a primitive of a lower layer protocol used for transmitting the request. This exemplary embodiment may be advantageous, when the base station system does not read the request itself in order to receive further information, but reads further information in the container messages including the request.

There are mobile communication systems such as system providing the General Packed Radio Service (GPRS), in which the base station system usually reads information from a registration request in case the request is sent with respect to a packet switched part of the system. Therefore, in one exemplary embodiment of the method and the system, the request is an attach request, particularly a GPRS attach request, for registering the mobile communication device in a packet switched part of the core network to which the identifier is assigned. A GPRS attach request is used for registering in a packet switched part of a core network supporting GPRS.

According to a further aspect, the subject innovation provides a system including the base station or one of its embodiments and the mobile communication device or one of its exemplary embodiments.

BRIEF DESCRIPTION OF THE DRAWINGS

The aforementioned and other aspects of the invention will be apparent from and elucidated with reference to the embodiments described hereinafter making reference to the accompanying drawings.

DETAILED DESCRIPTION OF SPECIFIC EMBODIMENTS

Figure 1:
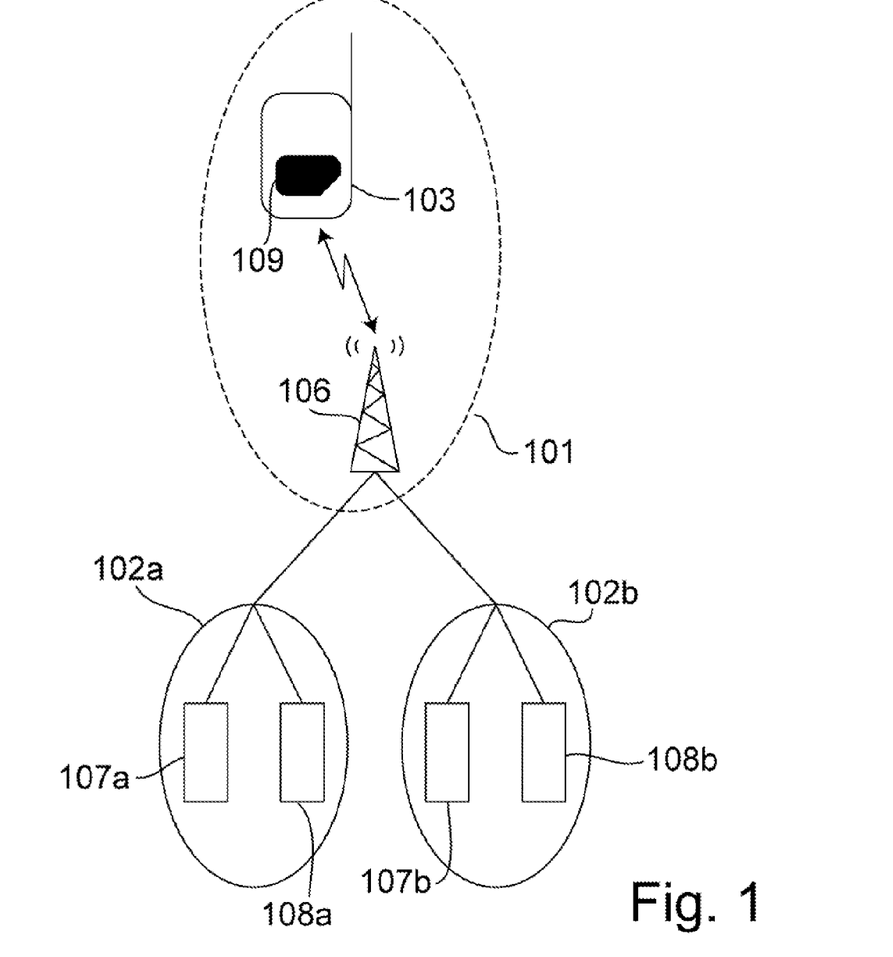
FIG. 1 is a diagram of a mobile communication system including a shared radio access network connected to multiple core networks.

FIG. 1 shows a shared radio access network 101 which is connected to multiple core networks 102a,b. By way of example, two core networks 102a,b are depicted, although more than two core networks may be connected to the shared radio access network 101. In addition, FIG. 1 depicts a mobile communication device 103 that is located in the serving area of the shared radio access network 101.

The shared radio access network 101 is configured as a cellular network comprising a plurality of radio cells, which are served by at least one base station system 106. In one embodiment, the shared radio access network 101 is configured as a GERAN and the base station system 106 is a Base Station Subsystem (BSS) according to the GSM specification, which includes a Base Station Controller (BSC) and one or more Base Transceiver Stations (BTS), which are connected to the BSS and serve as access points of the radio cells. However, the base station system 106 may likewise be configured in another way. For instance, it may be a base station system in a UTRAN including a Radio Network Controller (RNC) which is connected to one or more NodeBs.

In the depicted embodiment, the core networks 102a,b associated with the shared radio access network 101 comprise a circuit switched (CS) part for providing CS services, such as speech connections, and a packet switched (PS) part for providing PS services, such as data connections or other multimedia services. In the embodiment described herein, the PS services use the GPRS. The CS part of each core network 102a,b includes a switching unit 107a,b, which is configured as a Mobile Switching Centre (MSC), and the PS part of each core network 102a,b includes a routing unit 108a,b, which is configured as Serving GPRS Support Node (SGSN). In further embodiments, one or both core networks 102a,b may include only a CS or PS part and/or the parts may include other network nodes.

The mobile communication device 103 comprises a terminal including a radio module for wirelessly connecting the mobile communication device 103 to a radio access network 101. Furthermore, it includes a user identification module 109 which is detachably connected to the terminal and which is configured as a Subscriber Identification Module (SIM) in the embodiment described herein. The user identification module particularly stores data for identifying and authenticating itself, when the mobile communication device 102 accesses a core network 102a,b. Data memorized in the user identification module 109 are stored in elementary files (EFs).

To each of the core networks 102a,b connected to the shared radio access network 101a unique identifier is assigned, which is referred to as PLMN-ID herein. In one embodiment, in each radio cell of the radio access network 101, the serving base station system 106 broadcasts a list of the PLMN-IDs assigned to the connected core networks 102a,b. The list is included in the system broadcast information (SBI) messages, which comprise the system broadcast information and which are transmitted repeatedly via the broadcast channel of a radio cell, particularly the Broadcast Control Channel (BCCH).

However, in shared radio access networks 101 of certain type, particularly in GERANs, there may not be enough capacity to broadcast multiple PLMN-IDs in the SBI messages. For this reason or for another reason, an alternative embodiment provides that a further identifier, which is referred to as Common PLMN-ID herein, is used in the shared radio access network 101. In each radio cell of the shared radio access network 101, the serving base station system 106 broadcasts the Common PLMN-ID. For this purpose, the Common PLMN-ID is included in the SBI messages. The PLMN-IDs of the core networks 102a,b that are connected to the shared radio access network 101 are not transmitted.

Optionally, additional information indicating that the radio access network 101 is shared may be transmitted through the broadcast channel in each radio cell of the shared radio access network 101. The additional information may be an additional bit added to the system broadcast information in the shared radio access network 101. In a non-shared radio access network, the additional bit is not included in the system broadcast information. As an alternative, the additional bit may be present in the system broadcast information send in a shared radio access network 101 as well as in the system broadcast information send in a non-shared access network, but has different values according to whether the radio access network is shared or not.

In the user identification module 109 of the mobile communication device 103, a mapping data item 203 (see FIG. 2) is stored in a non-volatile memory. The mapping data item 203 includes an allocation between the Common PLMN-ID associated with the shared radio access network 101 and the PLMN-IDs of the core networks 102a,b connected to the shared radio access network 101. It is to be understood that the mapping data item 203 also includes mappings between the Common PLMN-IDs broadcasted in further shared radio access networks in the geographical area in which the mobile communication device 103 is used and the PLMN-IDs connected with such shared radio access networks.

Figure 2:
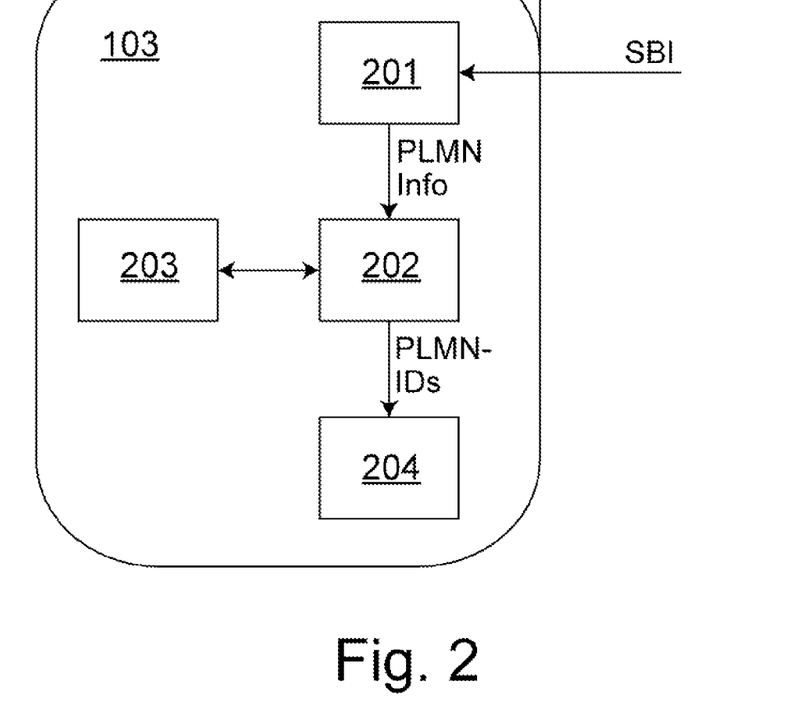
FIG. 2 is a block diagram of a mobile communication device for accessing the shared radio network.

The mapping data item 203 may be included in an additional elementary file in the user identification module 109, or it may be added to an existing elementary file. In one embodiment, the mapping data item 203 is added to the already existing elementary file "PLMN Network Name" (EFPNN), which comprises allocations between PLMN-IDs and the full and/or short names of the associated core networks 102a,b or their operators.

After the mobile communication device 103 is switched on, it selects in a PLMN selection process a PLMN to serve the mobile communication device 103 at its location. In addition, the PLMN selection process may be carried out, when the mobile communication device 103 is already in normal service mode and certain event triggers the change of the serving core network 102a,b. Such event may be a corresponding input of the user deciding to reselect the core network 102a,b or a determination that the serving core network 102a,b can no longer provide normal service.

For selecting a core network 102a,b, the mobile communication device 103 searches for radio cells in the whole spectrum to find the core networks 102a,b, providing service at the location of the mobile communication device 103. In the situation depicted in FIG. 1, these are the core networks 102a,b connected to the shared radio access network 101 and possibly further core networks connected to radio access networks, which are not shown in FIG. 1.

In the following, the PLMN selection process is described making reference to FIG. 2 that shows functional components of the mobile communication device 103 in a schematic functional block diagram.

A transceiver unit 201 of the mobile communication device 103 scans the relevant frequency spectrum in order to find the radio cells providing the strongest radio signal. In the present situation, these are the radio cells of the shared radio access network 101 and possibly of further radio networks. With respect to such radio cells, the transceiver unit 102 receives the SBI messages sent by the base station systems 106 serving the radio cells of available radio access networks. The SBI messages are then forwarded to an evaluation unit 202.

The transceiver unit 201 may comprise the radio module of the mobile communication device and associated control functions, which may be implemented as software of a processor unit controlling the radio module. The evaluation unit 202 may likewise be implemented as a software module executing the same or another processor unit of the mobile communication device 103. The same may apply to the PLMN selector 204 described below.

The evaluation unit 202 reads the PLMN information included in each received SBI message. In the SBI message received from the shared radio access network 101, the PLMN information includes the list of PLMN-IDs or the Common PLMN-ID. Possible further radio access networks may broadcast PLMN information, which also includes one or more PLMN-IDs or a Common PLMN-ID.

In case the base station system 106 of the shared radio access network 101 (and possible further shared radio access networks) broadcasts a list of the PLMN-IDs associated with the connected core networks 120a,b, the evaluation unit reads the PLMN-IDs from SBI message received from the base station system 106 and passes the PLMN-IDs to a PLMN selector 204. In addition, PLMN-IDs read from SBI messages received from further radio access networks are passed to the PLMN selector 204. Thus, the PLMN selector 204 disposes of a list of the PLMN-IDs of the core networks 102a,b available at the location of the mobile communication device 103.

In the embodiment in which the shared radio access network 101 (and possible further shared radio access networks) broadcasts the Common PLMN-ID instead of a list of the PLMN-IDs of the connected core networks 102a,b, the list of available core networks is prepared in a different way:

If PLMN information is received in a SBI message, the evaluation unit 202 determines whether in the received SBI message, the additional information is present which indicates that the radio access network 101 having sent the information is shared.

If the additional information is present and/or indicates that the SBI message has been received from the shared radio access network 101, the PLMN information includes the Common PLMN-ID and the evaluation unit 202 accesses the mapping data item 204 stored in the mobile communication device 102. From the mapping data item 204, the evaluation unit 202 determines the PLMN-IDs associated with the Common PLMN-ID and passes these PLMN-IDs to the PLMN selector 204.

If the additional information is not present and/or indicates that the SBI message has been received from the shared radio access network 101, the evaluation unit 202 forwards the PLMN-ID included in the received SBI message to the PLMN selector 204. In this way, PLMN-IDs broadcasted in possible further radio access networks covering the location of the mobile communication device 103 are forwarded to the PLMN selector 204. The mapping data item 203 may not be accessed, when there is no indication that the SBI message has been received from a shared radio network 101.

In case the use of the additional information is dispensed with, the evaluation unit 202 may compare the PLMN-IDs included in the received SBI messages with the Common PLMN-IDs included in the mapping data item 203. If a PLMN-ID matches one Common PLMN-ID, the evaluation unit 202 reads the allocated PLMN-IDs from the mapping data item 203 and forwards them to the PLMN selector 204. If no match is determined between the PLMN-ID included in the SBI message and the Common PLMN-IDs, the evaluation unit 202 forwards the received PLMN-ID to the PLMN selector 204. In this embodiment, the mapping data item 203 is accessed with respect to each received PLMN-ID—also with respect to PLMN-IDs of core networks broadcasted in non-shared radio access networks. The use of the additional information restricts the accesses to the mapping data items to the cases in which a Common PLMN-ID is received and thus simplifies and accelerates the PLMN selection process.

In both embodiments described before, the PLMN selector 204 selects a core network for registration using the list of the PLMN-IDs provided by the evaluation unit 202. This may be done in automatic or in manual mode.

In automatic mode, the PLMN selector 204 automatically selects some or all of the available core networks 102a,b in certain order and controls the mobile communication device 103 to try to access and register in selected core networks 102a,b until the registration is successful for one core network 102a,b. In one embodiment, the order is determined by a list of preferred core networks stored in the non-volatile memory of the user identification module 109. In addition, the user identification module 109 may store a list of forbidden core networks, which are not considered for selection. Due to this list, one or more core networks may be excluded from a possible selection. Within the lists, core networks 102a,b may again be specified using their PLMN-IDs.

In this embodiment, the PLMN selector 204 starts with controlling the mobile communication device 103 to try to register in the first core network 102a,b in the list of preferred core networks, the PLMN-ID of which is included in the list of available core networks and not in the list of forbidden core networks. Should the registration fail, the PLMN selector 204 controls the mobile communication device 103 to try to register in the other available core networks 102a,b, which are not in the list of forbidden core networks, in the order of preference specified in the list of preferred core networks.

In manual mode, the PLMN selector 204 may present to the user of the mobile communication device 103 a list specifying the available core networks 102a,b. Within the presented list, the core networks 102a,b are preferably identified using explicit names instead of the PLMN-IDs. The names may be determined using the aforementioned EFPNN stored in the user identification module 109. From the list the user selects a core network 102a,b of his choice and the PLMN selector 204, which receives the selection of the user, controls the mobile communication device 103 to try to register in the core network 102a,b selected by the user. If the registration is successful, the core network 102a,b is selected to serve the mobile communication device 103. In case of a registration failure, the PLMN selector 204 may again present the list of available core networks 102a,b, to the user so that the user selects another core network 102a,b in which the mobile communication device 103 then tries to register.

For registering in a core network 102a,b connected to the shared radio access network 101, the mobile communication device 103 establishes a radio connection to the base station system 106. Via the radio connection, the mobile communication device 103 sends a request for registration, which is forwarded to the core network 102a,b and which is answered affirmative or in the negative depending on whether the registration in the core network 102a,b is successful or not.

The registration in a core network 102a,b may differ depending on whether the mobile communication device 103 whishes to register in the CS or in the PS part of the core network 102a,b. In particular, different protocols are applied for transmitting the registration request from the mobile communication device 103 to the switching unit 107a,b of the CS part and to the routing unit 108a,b of the PS part of a core network 102a,b. In the following, the registration process is described with respect to the core network 102a. The registration in the core network 102b may be done in the same manner, if desired.

Figure 3:
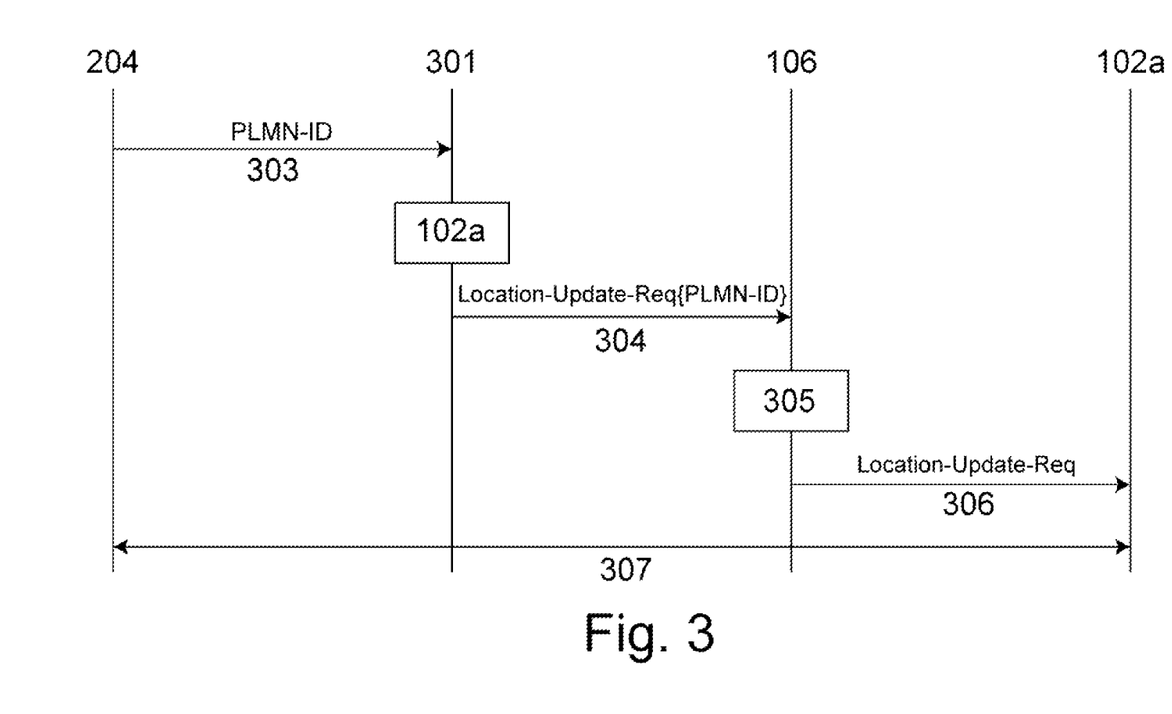
FIG. 3 is a block diagram showing a depiction of steps for transmitting a request for registering in a circuit switched part of a core network connected to the shared radio access network.

In FIG. 3, steps for registering the mobile communication device 103 in the CS part of the core network 102a are depicted. A mobility management (MM) entity 301 of the mobile communication device 103, which is responsible for CS connections, generates a request for registering in the core network 102a in step 302. The CS MM entity 301 may particularly be an instance of a mobility management protocol, such as the GSM MM protocol. As depicted in FIG. 1, the request may be a Location Updating Request of the type "IMSI Attach" according the GSM MM protocol. The generation of the request may be done in response to a corresponding command received from the PLMN selector 204 in step 303 upon a selection of a core network 102a.

Into the request, the CS MM entity 301 includes the PLMN-ID of the core network 102a to register in. For this purpose, the PLMN selector 204 may pass the PLMN-ID to the CS MM entity 301 in step 303. Within the request, the PLMN-ID may supplement further information, which is known to a person skilled in the art in principle and which may be defined in the used mobile communication standard specifications. Such information may particularly include information about capabilities of the mobile communication device 103.

Upon the request being generated, the mobile communication device 103 sends the request to the base station system 106 in step 304. For transmitting the request, it may be included in primitives of lower protocol layers below the used MM protocol. When the base station system 106 receives the request, it evaluates the request and reads the PLMN-ID included in the request. The request may be accessed by the base station system 106 by default in order to read further information included therein, such as the capability information, which may be used in the base station system 106 in order to configure the connection to the mobile communication device 103. The PLMN-ID may be read from the request in addition to the other information, in order to be able to route the request to a core network 102a.

Based upon the read PLMN-ID, the base station system 106 then determines the core network 102a to which the request is to be routed in step 305 from the core networks 102a,b connected to the base station system 106. In addition, the base station system 108 determines the network mode of the relevant core network 102*a,b* to send the request to which is the switching unit 107*a* in the present case. For this purpose, there may be stored in the base station system 106 an allocation between PLMN-IDS of the connected core networks 102*a,b* and addresses or other identifiers of the switching units 107*a,b* and the routing units 108*a,b* of the core networks 102*a,b*. Using such allocation the base station system 106 may determine the address of the switching unit 107*a* of the core network 102*a*, when the PLMN-ID of the core network 102*a* is included in the request. The routing units 108*a,b* are not considered with respect to a request for registration in the CS part of a core network. If the core network 102 includes multiple switching units 107*a*, the base station system 106 may determine the switching unit 107*a* to which the request is to be routed based on criteria stored in the base station system 106.

Thereupon, the base station system 106 forwards the request to the switching unit 107*a* comprised in the CS part of the core network 102*a* in step 306. Within the switching unit 107*a* an MM entity of the switching unit 107*a* receives the request and initiates a process for registering the mobile communication device 103. This process, which may be executed in a way known to a person skilled in the art, may comprise identifying and authenticating the mobile communication device 103*a* and parameters of the connection to the mobile communication device 103 may be specified by the switching unit 107*a*. In FIG. 1, this part of the registration process is depicted as step 307.

Upon receipt of the registration request, the switching unit 107*a* may assign to the mobile communication device 101 a temporary identification number, particularly a Temporary Subscriber Identification (TMSI), which may include an identification of the switching unit 107*a*. This temporary identification number may be transmitted to the mobile communication device 103 and stored therein. When the mobile communication device 103 sends to the core network 102*a* a message including signaling information and/or user data after the successful registration in the core network 102, the temporary identification number may be included in such messages and the base station system 106 may use the temporary identification number to determine the switching unit 107*a* to which the messages are to be routed.

However, as an alternative, the mobile communication device 103 may also include the PLMN-ID of the selected core network 102*a* into the messages following the registration request and the base station system 106 may read the PLMN-ID from the messages and may route the messages to the switching unit 107*a* using the PLMN-ID in the same way as the request for registration.

Figure 4:
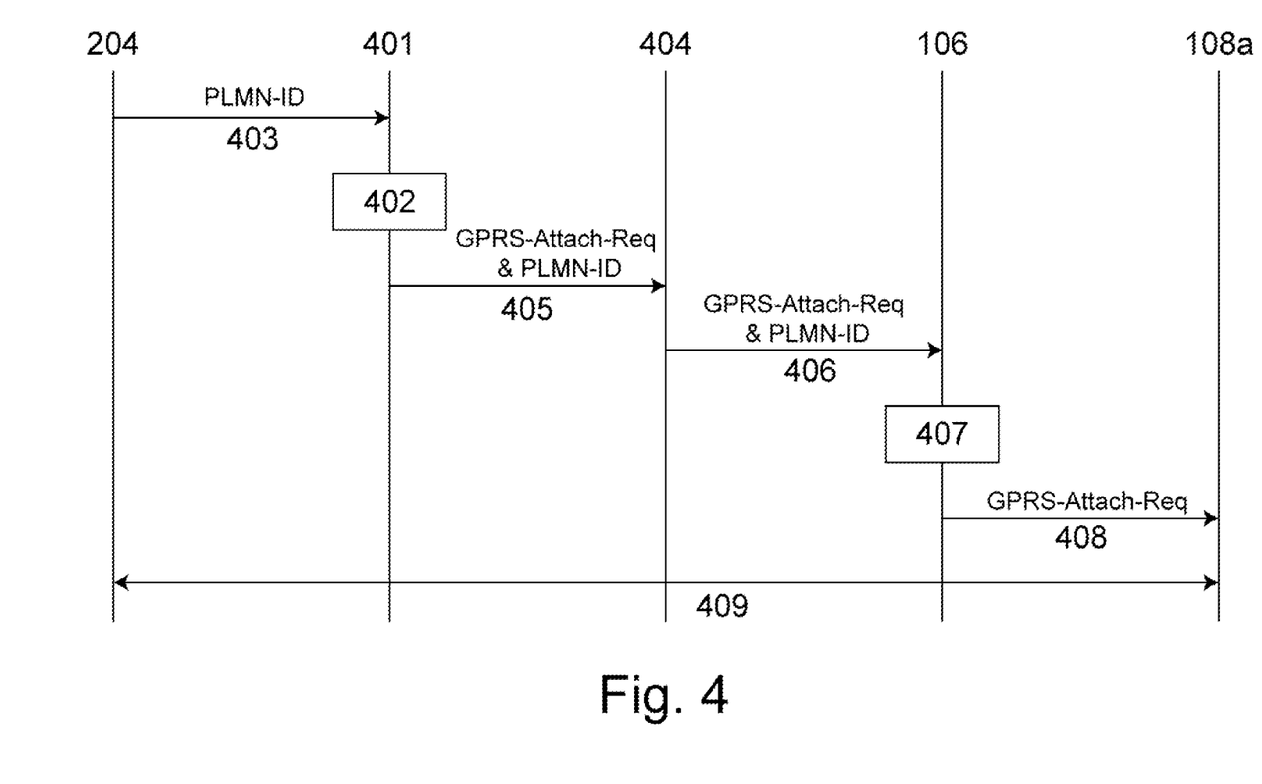
FIG. 4 is a block diagram showing a depiction of is a depiction of steps for transmitting a request for registration in a circuit switched part of a core network connected to the shared radio access network.

In FIG. 4, steps for registering the mobile communication device 103 in the PS part of core network 102*a* are depicted. In order to initiate the registration, an MM entity 401 of the mobile communication device, which is responsible for PS connections, generates a registration request in step 402. In particular, the PS MM entity 402 may be an instance of the GPRS Mobility Management (GMM) protocol. The request may be configured as GPRS Attach Request as shown in FIG. 4, by way of example. The PS MM entity 401 may generate the request upon receiving a corresponding command from the PLMN selector 204 in step 403.

Upon having generated the registration request, the PS MM entity 401 passes the request to an entity 404 in step 405, the entity 404 being an instance of a lower layer protocol below the used MM protocol. In one embodiment, the entity 404 is an entity of the Logical Link Control (LLC) protocol, and the PS MM entity 404 may forward the request to the entity 404 within a LL-Unitdata-Req primitive.

In addition to the request, the PS MM entity 401 passes to the entity 404 the PLMN-ID of the selected core network 102. The PLMN-ID may be forwarded to the PS MM entity 401 for this purpose from the PLMN selector 204, when the PLMN selector 204 sends the command to generate the registration request. The PLMN-ID may be forwarded to the entity 402 in addition to further information. The further information may include a Temporary Logical Link Identifier (TLLI), which may be generated randomly when the mobile communication device 103 initiates the registration in the core network 102*a*. The TLLI may be used in the base station system 106 to identify the mobile communication device 103 in a way which is known to a person skilled in the art.

The entity 404 forwards the request and the further information including the PLMN-ID such that it is transmitted from the mobile communication device 103 to the base station system 106 in step 406. Here, the request and the additional information may be sent to the base station system 106 using one or more primitives of further protocol layers, which are in principle known to a person skilled in the art.

When the base station system 106 receives the registration request, it reads the PLMN-ID accompanying the request in order to determine the core network 102*a,b*, to which the request is to be routed in step 407. In addition, it determines the network core made of the relevant core network 102*a,b* to route the request to. This may be done in the same way as it has been described in connection with the routing of the request to register in the CS part of the core network 102*a*. In particular, the base station determines that the request is to be forwarded to the routing unit 108*a* of the core network 102*a*. This determination may be made using the allocation between PLMN-IDS of the core networks 102*a,b* connected to the base station system 106 and addresses or other identifiers of the switching units 107*a,b* and the routing units 108*a,b* of the core networks 102*a,b*. If the core network 102*a* includes multiple routing units 108*a*, the base station system 106 determines the routing unit 108*a* to which the request is to be routed based on criteria and/or process stored in the base station system 106.

In addition to the PLMN-ID, the base station system 106 may read and evaluate or otherwise use data included in the other information accompanying the request. In particular, the base station system 106 may read the TLLI, which serves as an address of the mobile communication device 103 in the data transfer from the core network 102*a* to the mobile communication device 103 according to the GPRS specifications. Thus, the base station system 106 may read the PLMN-ID using s similar mechanism as it is used for reading the further information, particularly the TLLI. The request for registration, which is usually not read by base station system 106 according to the GPRS specification, does also not need to be read in order to receive the PLMN-ID.

After having determined the routing unit 108*a* as the addressee of the registration request, the base station system 106 forwards the request to the routing unit 108*a* comprised in the PS part of the core network 102*a* in step 408. The forwarding may also be made using one or more primitives of the communication protocols, which are used in the communication between the base station system 106 and the routing unit 108*a* and which are known to a person skilled in the art in principle. The additional information accompanying the request may be forwarded partly to the routing unit 108*a*, but the PLMN-ID may not be forwarded in one embodiment. However, it is likewise possible that the mobile station system 106 also forwards the PLMN-ID.

Within the routing unit 108a, MM entity of the routing unit 108a receives the request and initiates a process for registering the mobile communication device 103. This process, which may again be executed in a way known to a person skilled in the art, may comprise identifying and authenticating the mobile communication device 103a as well as setting parameters of the connection to the mobile communication device 103. This part of the registration process is depicted as step 409 in FIG. 4.

In one embodiment, the routing unit 108a assigns to the mobile communication device 103 a temporary identification number, in connection with the registration of the mobile communication device 103 in the routing unit 108a. The temporary identification number may be a Packet TMSI (P-TMSI) and in connection with the registration, a new TLLI determined from the P-TMSI may be assigned to the mobile communication device 103. As the TMSI described before, the P-TMSI may include an identifier or address of the routing unit 108a. After having received the new P-TMSI, the mobile communication device 103 may send further messages including signaling and/or user data together with the P-TMSI and the base station system 106 may use the P-TMSI to determine the routing unit 108a,b to which the messages are to be forwarded.

In an alternative embodiment, the mobile communication device 103 may also include the PLMN-ID of the selected core network 102a into the messages following the registration request and the base station system 106 may read the PLMN-ID from such messages and may route the messages to the routing unit 108a using the PLMN-ID in the same way as the request for registration.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. Any reference signs in the claims should not be construed as limiting the scope.

What is claimed is:

1. A method for routing in a base station system a message received from a mobile communication device to a core network, the base station system being connected to at least two core networks, to each core network an identifier being assigned, the method comprising:
    receiving in the base station system the message from the mobile communication device together with an identifier assigned to a first core network of the core networks, wherein the identifier added to the message by the mobile communication device is determined in the mobile communication device based upon information in a broadcast message broadcasted by the base station system in a radio cell of a shared radio access network in which the mobile communication device is located, wherein the broadcast message broadcasted by the base station system comprises a list of identifiers or a common identifier and additional information indicating that the radio access network is shared;
    broadcasting a common identifier from the base station system;
    determining the identifier based upon the common identifier at the mobile communication device;
    determining the identifier by the mobile communication device using an allocation between the common identifier and the identifier stored in the mobile communication device;
    reading the identifier in the base station system; and
    forwarding the message from the base station system to the first core network based upon the read identifier.

2. The method recited in claim 1, wherein the message comprises a request for registering the mobile communication device in the core network to which the identifier is assigned.

3. The method recited in claim 1, wherein the identifier is included in a request for registering the mobile communication device in the core network to which the identifier is assigned.

4. The method recited in claim 3, wherein the request is an attach request, comprising a Location Updating Request of the type IMSI attach, for registering the mobile communication device in a circuit switched part of the core network to which the identifier is assigned.

5. The method recited in claim 1, wherein the message comprises a container message comprising a first part including the request and a second part including the identifier.

6. The method recited in claim 5, wherein the request is an attach request, particularly a GPRS attach request, for registering the mobile communication device in a packet switched part of the core network associated with the identifier.

7. A method according to claim 1, wherein the additional information indicating that the radio access network is shared is additional bit added to the broadcast message.

8. A base station system for use in a shared radio access network, the base station system being connected to at least two core networks, an identifier being assigned to each core network, the base station system receiving a message from a mobile communication device together with an identifier assigned to a first core network of the core networks, the base station system reading the identifier and forwarding the message to the first core network based upon the read identifier, wherein the identifier added to the message by the mobile communication device is determined in the mobile communication device based upon information in a broadcast message broadcasted by the base station system in a radio cell of a shared radio access network in which the mobile communication device is located, wherein the broadcast message broadcasted by the base station system comprises a list of identifiers or a common identifier and additional information indicating that the radio access network is shared, wherein a common identifier is broadcasted from the base station system, the identifier is determined based upon the common identifier at the mobile communication device, and the identifier is determined by the mobile communication device using an allocation between the common identifier and the identifier stored in the mobile communication device.

9. A mobile communication device for use in a shared radio access network connected to at least two core networks, an identifier being assigned to each core network, the mobile communication device being configured to send a message to a first core network of the core networks via a base station system of the shared radio access network such that the message comprises the identifier assigned to the first core network, wherein the identifier added to the message by means of the mobile communication device is determined in the mobile communication device based upon information in a broadcast message broadcasted by the base station system in a radio cell of a shared radio access network in which the mobile communication device is located, wherein the broadcast message broadcasted by the base station system comprises a list of identifiers or a common identifier and additional information indicating that the radio access network is shared, wherein a common identifier is broadcasted from the base station system, the identifier is determined based upon the common identifier at the mobile communication device, and the identifier is determined by the mobile communication device using an allocation between the common identifier and the identifier stored in the mobile communication device.

10. A system, comprising:
- a base station system for use in a shared radio access network, the base station system being connected to at least two core networks, an identifier being assigned to each core network, the base station system receiving a message from a mobile communication device together with an identifier assigned to a first core network of the core networks, the base station system reading the identifier and forwarding the message to the first core network based upon the read identifier; and
- a mobile communication device for use in the shared radio access network, the mobile communication device sending a message to the first core network of the core networks via the base station system such that the message comprises the identifier assigned to the first core network, wherein the identifier added to the message the mobile communication device is determined in the mobile communication device based upon information in a broadcast message broadcasted by the base station system in a radio cell of a shared radio access network in which the mobile communication device is located, wherein the broadcast message broadcasted by the base station system comprises additional information indicating that the radio access network is shared, wherein a common identifier is broadcasted from the base station system, the identifier is determined based upon the common identifier at the mobile communication device, and the identifier is determined by the mobile communication device using an allocation between the common identifier and the identifier stored in the mobile communication device.

* * * * *